July 13, 1937.  J. V. SCHAFER  2,086,782
FISHING REEL
Filed June 18, 1934  2 Sheets-Sheet 1
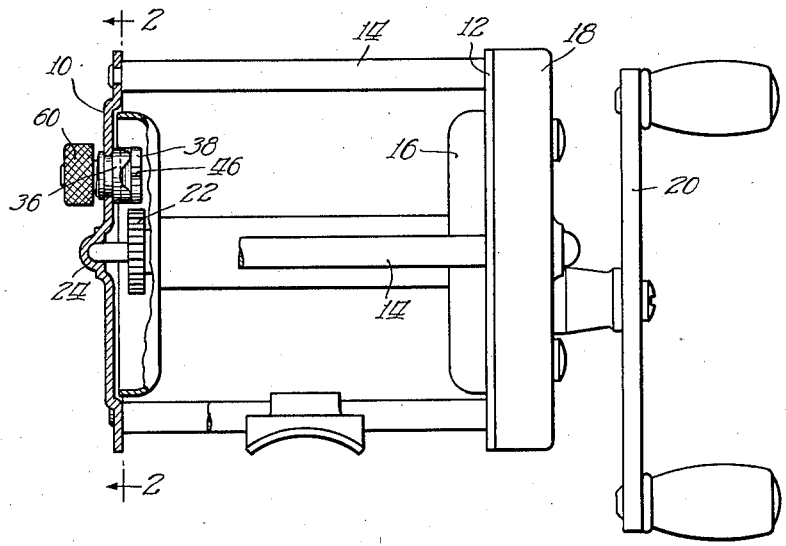
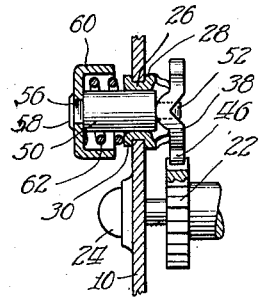
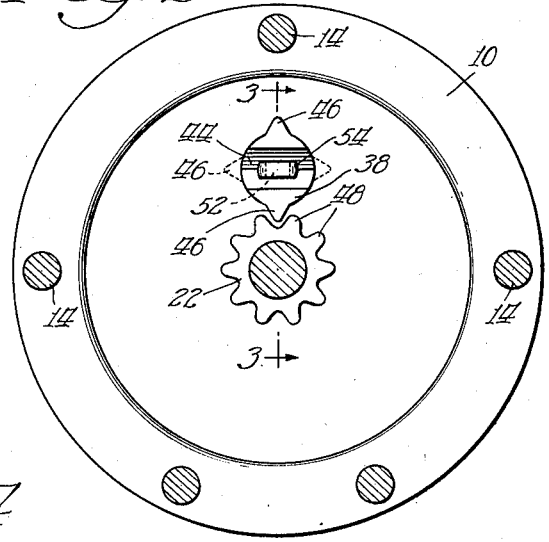
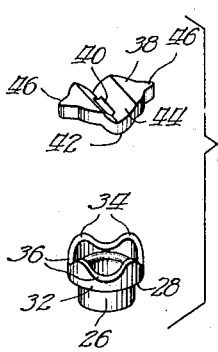
Inventor:
John V. Schafer
By: Freeman and Sweet
Attys.

July 13, 1937. J. V. SCHAFER 2,086,782
FISHING REEL
Filed June 18, 1934 2 Sheets-Sheet 2

Inventor:
John V. Schafer
By:
Freeman and Sweet
Attys.

Patented July 13, 1937

2,086,782

UNITED STATES PATENT OFFICE 2,086,782

FISHING REEL

John V. Schafer, Bronson, Mich., assignor to Bronson Reel Company, Bronson, Mich., a corporation of Michigan Application June 18, 1934, Serial No. 731,011

12 Claims. (Cl. 242—84.6)

My invention relates to fishing reels and includes among its objects and advantages increased durability and simplicity in the click mechanism of such reels combined with complete certainty of operation.

In the accompanying drawings:

Figure 1 is a side elevation of a complete reel partly broken away and in section to show the click mechanism;

Figure 2 is a section on line 2—2 of Figure 1;

Figure 3 is a section on line 3—3 of Figure 2;

Figure 4 is a perspective view of the click proper and its cam support, in disassembled position;

Figure 6:
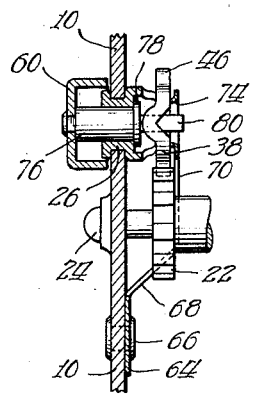
Figure 6 is a section similar to Figure 3 illustrating the same form of spring.

In the embodiment of the invention selected for illustration the reel comprises the usual end plates 10 and 12 united in a frame by pillars 14 and supporting the spool 16, with suitable mechanical transmission means housed in the housing 18 and actuated by the handle 20 for rotating the spool.

The click wheel 22 is mounted on the end of the spool remote from the housing 18 and adjacent the end bearing 24.

The end plate 10 is apertured to receive a stationary click support having a tubular portion 26 passing through the aperture in the plate. A shoulder 28 is formed at one end of the tubular portion 26 before assembly, and a similar opposing shoulder 30 is flared out to fasten the support in place on the plate 10. Beyond the shoulder 28 the support continues in the form of a second cylindrical portion of larger diameter 32 which has its inner edge serrated to define two pairs of diametrically opposed elevations 34 separated by diametrically opposed depressions 36.

The click proper comprises a body 38 pierced at 40 to form a square hole and upset to define a transversely extending cylindrical surface at 42 shaped to fit in either pair of the depressions 36. In upsetting the metal to form the cylindrical portion 42 a groove 44 is formed in the opposite face. On opposite sides of the groove 44 the body 38 carries click points 46 which are especially hardened or tempered to prolong their period of effective wearing contact with the teeth 48 of the click wheel 22.

The support for the click element proper comprises a shaft 50 having a square projection 52 shaped to enter the opening 40 and subsequently riveted over as clearly indicated at figure 54 in Figure 2. The outer end of the shaft 50 carries a square extension 56 riveted over at 58 to fasten the cap 60 in place. Before assembling the cap 60 a helical spring 62 is placed around the shaft 50. In assembled position this spring presses against the inner surface of the cap 60 and the flange 30 on the supporting structure and tends to hold the click with its cylindrical portion 42 seated in one or the other of the pairs of depressions 36.

In Figure 2 the parts are illustrated in position for the click to be operative, and it will be apparent that movement of the teeth 48 by rotation of the spool will push the lower point 46 to either side causing the cylindrical click portion 42 to ride partly up out of the depressions 36 in which it is seated, and then as one tooth passes out of effective engagement with the click point the point will snap back against the next tooth. I prefer to make the rivet connection at 54 loose enough to permit the click element proper about ten degrees of freedom to wobble around and adjust itself to the forces acting on it. This contributes both to durability and to freedom of movement and quick response by the parts. To move the click into inoperative position it is only necessary to rotate the cap 60 ninety degrees in either direction and thus bring the points 46 to the dotted line position of Figure 2 leaving the click inoperative. The spring 62 not only actuates the click when it is in operative position, but is the sole spring holding means for holding the click in either operative or inoperative position.

It will also be apparent that rotation of the click proper 180° from the position shown in Figure 2 will bring the other click point into operation. The wear on the click point is rather heavy during active use of the reel, and the ready availability of two click points doubles the effective life of this part of the reel. The change from one point to the other can be made instantaneously while the reel is in active use, and after one point is a little worn, the user has available two clicks for alternative use, one of which is a little more powerful than the other.

Figure 5:
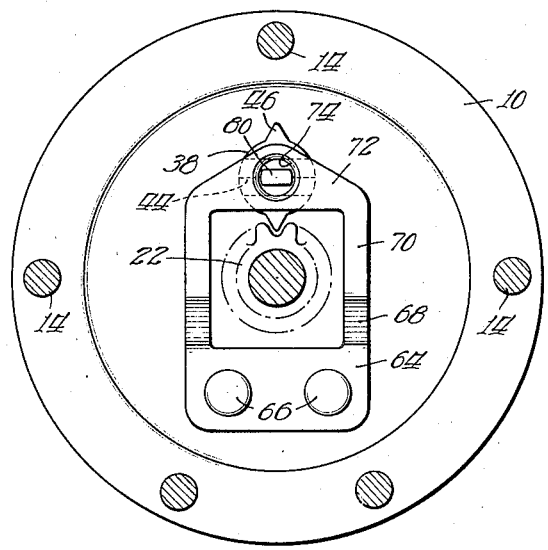
Figure 5 is a section similar to Figure 2 illustrating an alternative form of spring.
Figure 7:
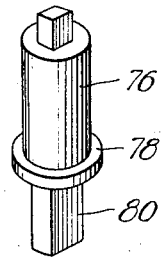
Figure 7 is a perspective view of the main shaft for the click support of Figure 6 prior to assembly.

Referring now to Figures 5 and 6, a plate 64 of spring steel is riveted at 66 to the end plate 10 and has spaced arms offset at 68 and then extending parallel to the plate 10 as at 70 to join a bridge 72 having an eyelet-like bearing portion 74 riding on the click element. The shaft 76 differs from the shaft 50 in having a shoulder 78, and in that its squared projection 80 is not riveted over.

In both embodiments metal surfaces have to slide back and forth over each other and a goodly fraction of the energy necessary to displace the click point may be absorbed by the friction of the surfaces. This decreases the impact between the returning point and the next advancing wheel tooth and also very markedly increases the energy absorbed by the click for a given initial force of displacement.

When the angler is trolling or still fishing with a sinker, and the pull on the line is too heavy for the click, the angler can let a thumb or finger bear on the head 60 and increase the initial holding force to any desired extent.

Without further elaboration, the foregoing will so fully explain my invention that others may, by applying knowledge current at the time of application, readily adapt the same for use under various conditions of service.

I claim:

1. A fishing reel comprising, in combination: a frame; a spool journaled on said frame; a click wheel on said spool; a click having a plurality of click points; a click support having cam surfaces for holding said click in any one of a plurality of inoperative and in any one of a plurality of operative positions; and a single spring acting axially on said click to hold it against said cam surfaces, and to actuate it when in operative position.

2. A fishing reel comprising, in combination: a frame; a spool journaled on said frame; a click wheel on said spool; a click having a plurality of click points; a click support having cam surfaces for holding said click in any one of a plurality of inoperative and in any one of a plurality of operative positions; and a single spring acting on said click to hold it against said cam surfaces, and to actuate it when in operative position.

3. A fishing reel comprising, in combination: a frame; a spool journaled on said frame; a click wheel on said spool; a click having a plurality of click points; a click support having cam surfaces for holding said click in any one of a plurality of operative positions; and a single spring acting on said click to hold it against said cam surfaces, and to actuate it when in operative position.

4. A fishing reel comprising, in combination: a frame; a spool journaled on said frame; a click wheel on said spool; a click having a plurality of click points in the same axial plane but circumferentially spaced; a rotary support for said click; said support having a fixed axis; and means for retaining said click in any one of a plurality of operative, or in any one of a plurality of inoperative, positions.

5. In a fishing reel, in combination: a spool; a frame in which said spool is journaled; a toothed click wheel at one end of said spool; a click member having heads; a stationary support for said member; said support and click member having inter-engaging cam portions for holding said click in any one of a plurality of operative or in any one of a plurality of inoperative positions; the cam portions maintaining their action for a sufficient distance to return the click member to operative position after displacement sufficient to let a wheel tooth pass by the click head; and externally accessible means for adjusting the click member into any one of said positions; said adjusting means comprising an adjusting element rotatably mounted in said frame and projecting outwardly therefrom, and spring means inside said frame pressing said member axially of said element, said element and member having inter-engaging surfaces preventing relative rotation but permitting relative axial movement.

6. In a fishing reel, in combination: a spool; a frame in which said spool is journaled; a toothed click wheel on said spool; a bearing in said frame; a click member; a resilient lost-motion connection between said click member and said bearing; said click member being permitted both rotary and axial lost motion with respect to said bearing; operation of said click by said wheel moving said click member axially.

7. In a fishing reel, in combination: a spool; a frame in which said spool is journaled; a toothed click wheel on said spool; a bearing in said frame; a click member; a resilient lost-motion connection between said click member and said bearing; said click member being permitted both rotary and axial lost motion with respect to said bearing; said bearing having cam surfaces guiding the movement of said click.

8. In a fishing reel, in combination: a spool; a frame in which said spool is journaled; a toothed click wheel on said spool; a bearing in said frame; a click member; a resilient lost-motion connection between said click member and said bearing; said click member being permitted both rotary and axial lost motion with respect to said bearing; said bearing having cam surfaces guiding the movement of said click; an adjusting shaft rotatable and longitudinally slidable in said bearing; and manual adjustment means at the outer end of said adjustment shaft.

9. In a fishing reel, in combination: a spool; a frame in which said spool is journaled; a toothed click wheel on said spool; a bearing in said frame; a click member; a resilient lost-motion connection between said click member and said bearing; said click member being permitted both rotary and axial lost motion with respect to said bearing; said bearing having cam surfaces guiding the movement of said click; an adjusting shaft rotatable in said bearing but restrained against axial sliding; and manual adjustment means at the outer end of said adjustment shaft.

10. In a fishing reel, in combination: a frame; a spool journaled in said frame; a toothed click wheel on said spool; a click member mounted in said frame; said click member having a point adapted to be positioned in the path of the teeth of said wheel; and resilient means tending to hold said point in the path of said teeth; said resilient means including a spring and a transmission between said spring and said click member; said transmission including rigid elements having sliding contact with each other during deflection and return of said point; and cam means forming part of said transmission and shaped to hold said click member in any one of a plurality of operative positions, or in at least one inoperative position; said click member having a plurality of points, one for each operative position.

11. In a fishing reel, in combination: a frame; a spool journaled in said frame; a toothed click wheel on said spool; a click member; said click member having a point adapted to be positioned in the path of the teeth of said wheel; and resilient means tending to hold said point in the path of said teeth; said resilient means including a spring and a transmission between said spring and said click member; said transmission including rigid elements having sliding contact with each other during deflection and return of said point.

12. In a fishing reel, in combination: a frame;

a spool journaled in said frame; a toothed click wheel on said spool; a click member; said click member having a point adapted to be positioned in the path of the teeth of said wheel; and resilient means tending to hold said point in the path of said teeth; said resilient means including a coil spring and a transmission between said spring and said click member; said transmission including rigid elements having sliding contact with each other during deflection and return of said point.

JOHN V. SCHAFER.